T. H. KEPPEL, R. F. KEPPEL & J. E. KEPPEL, Jr.
AEROPLANE.
APPLICATION FILED JULY 20, 1911.
1,026,677.
Patented May 21, 1912.
7 SHEETS—SHEET 1.
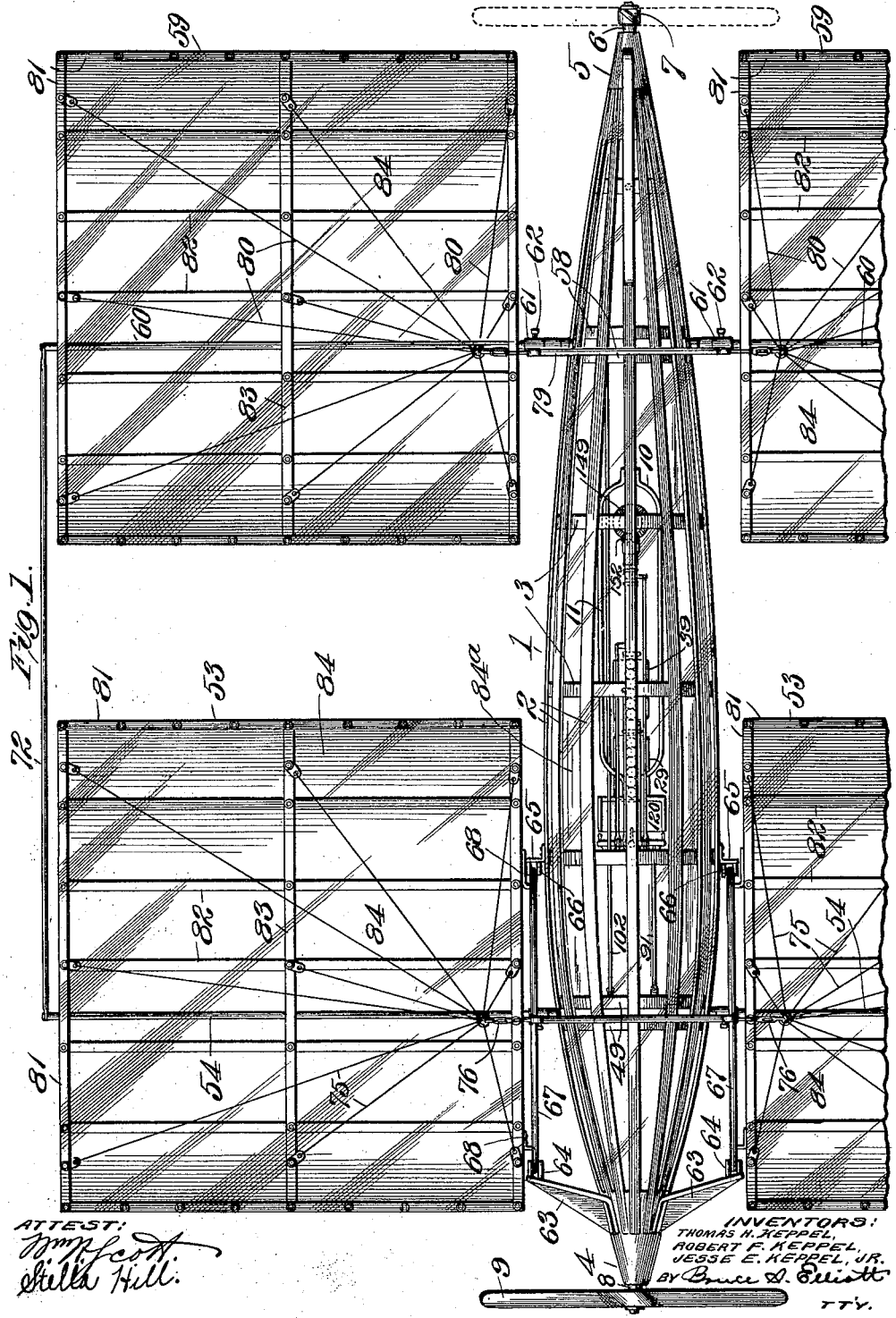

T. H. KEPPEL, R. F. KEPPEL & J. E. KEPPEL, Jr.
AEROPLANE.
APPLICATION FILED JULY 20, 1911.
1,026,677.
Patented May 21, 1912.
7 SHEETS—SHEET 2.
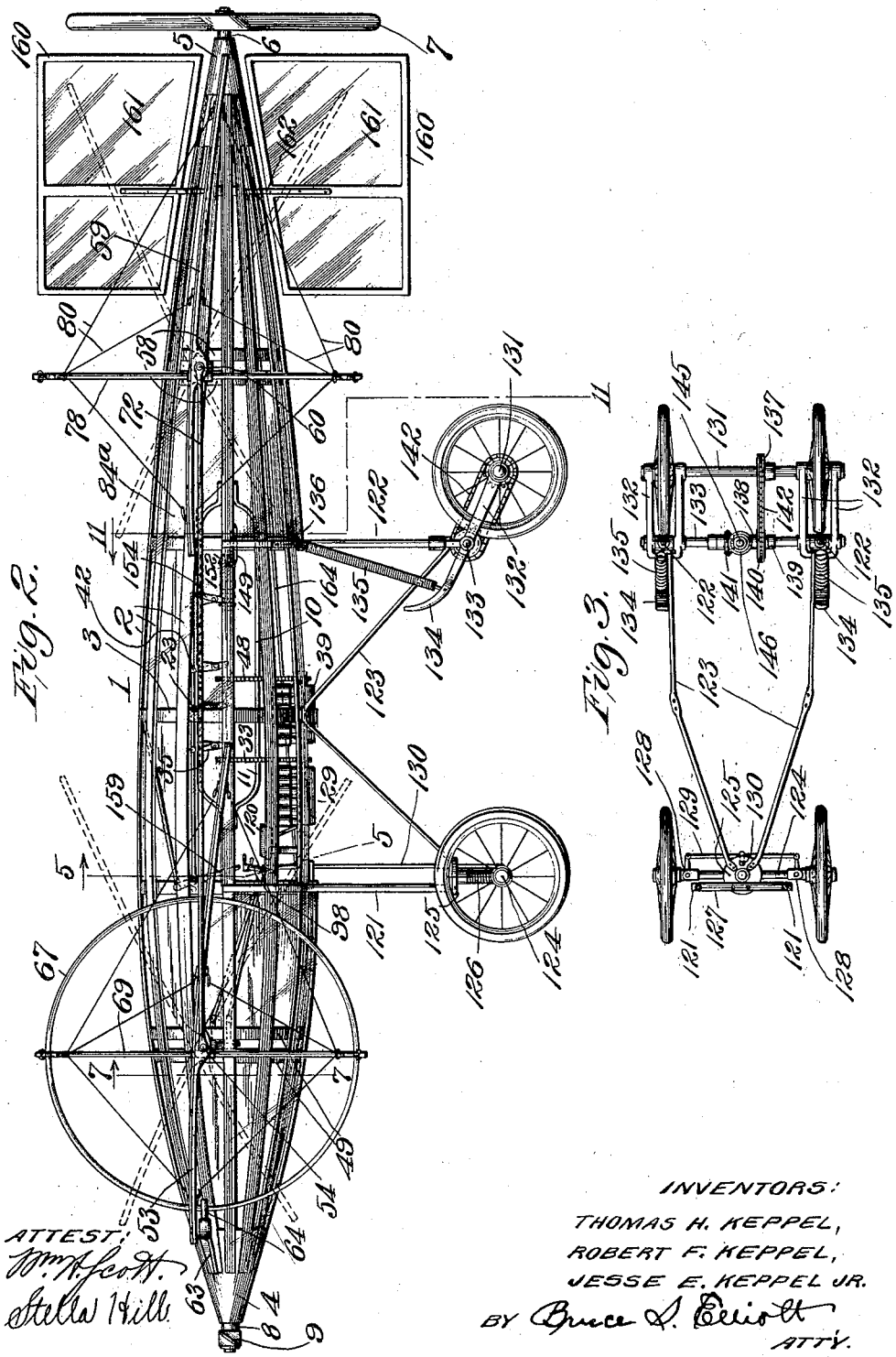
INVENTORS:
THOMAS H. KEPPEL,
ROBERT F. KEPPEL,
JESSE E. KEPPEL JR.

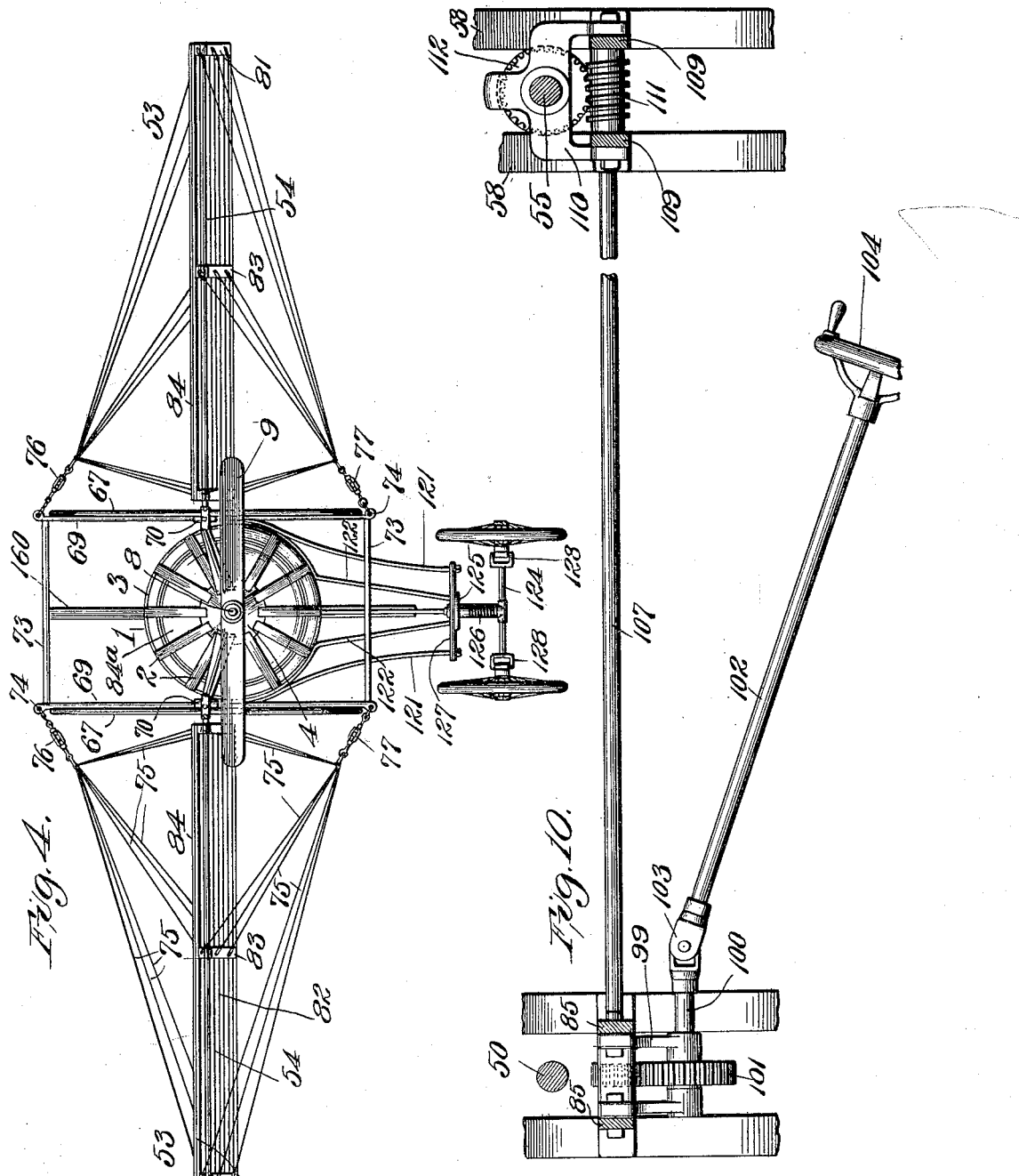

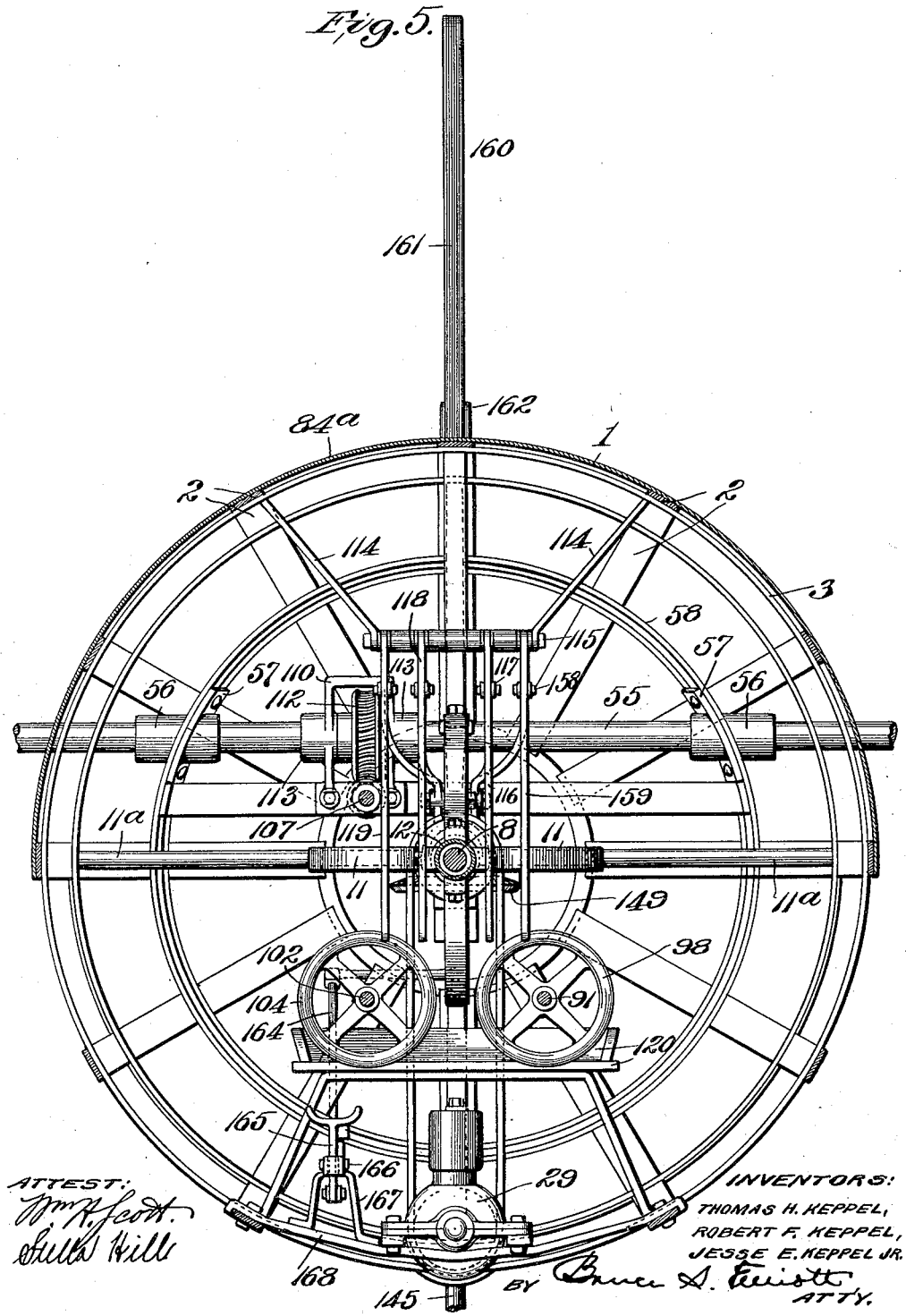

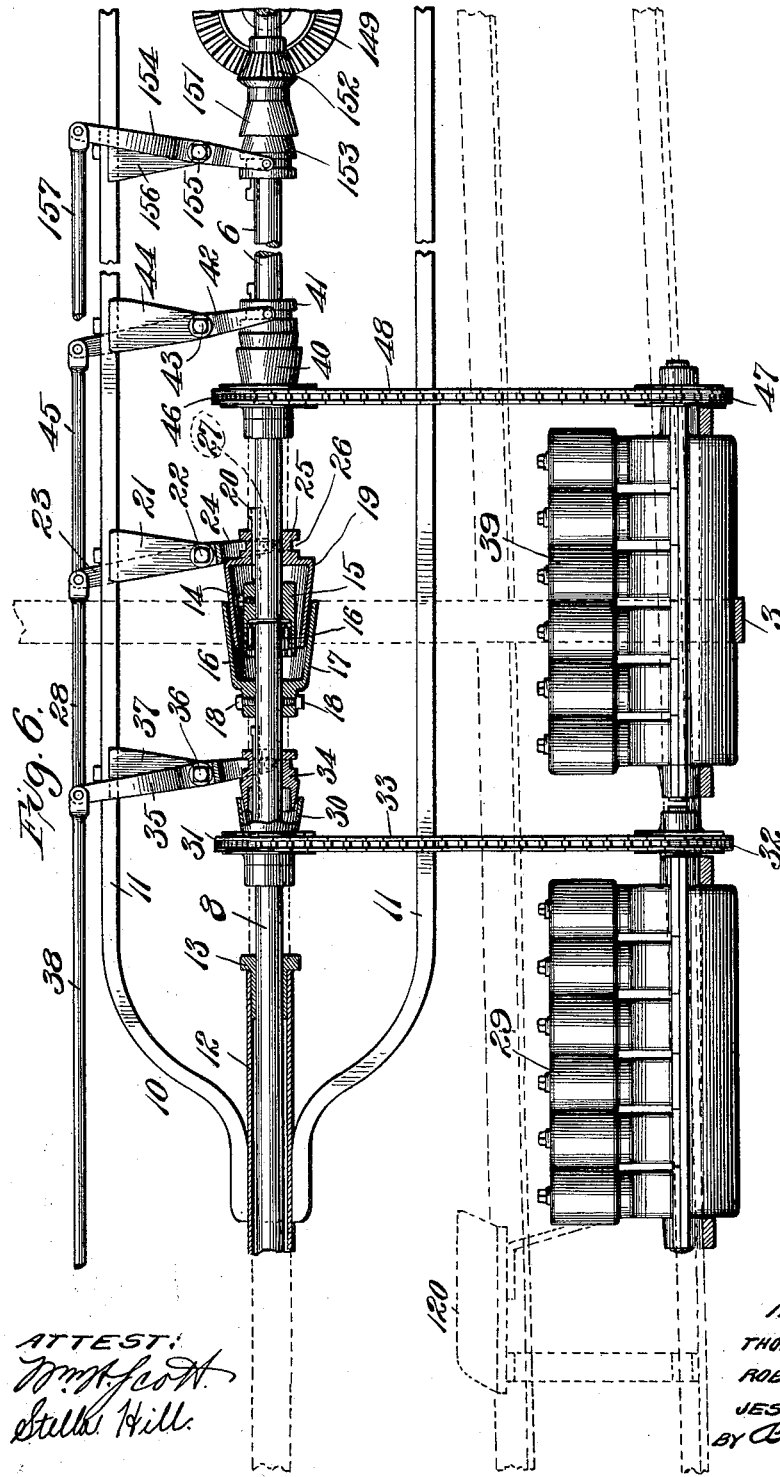

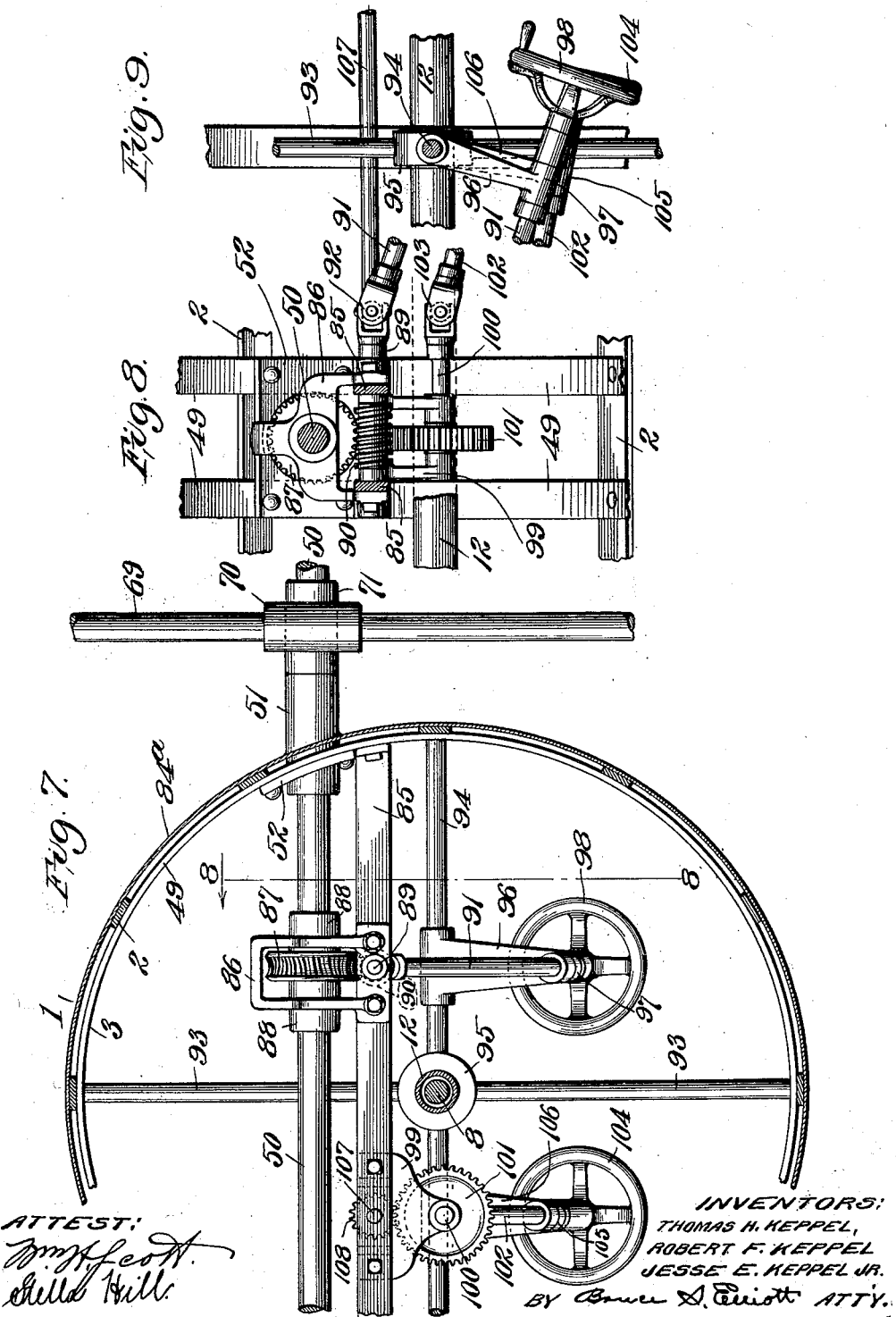

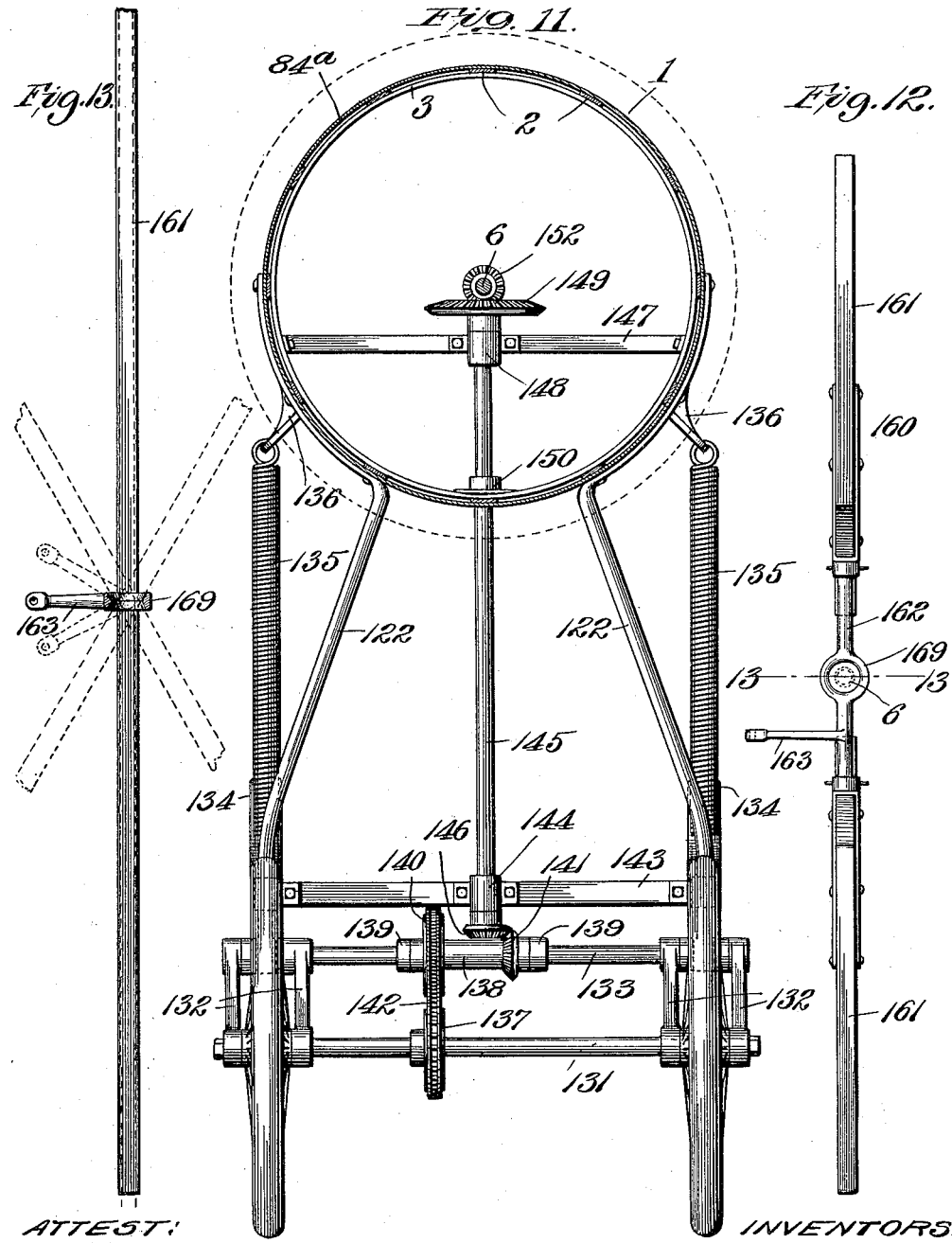

UNITED STATES PATENT OFFICE.

THOMAS H. KEPPEL AND ROBERT F. KEPPEL, OF ST. LOUIS, MISSOURI, AND JESSE E. KEPPEL, JR., OF INDIANAPOLIS, INDIANA.

AEROPLANE.

1,026,677.      Specification of Letters Patent.      Patented May 21, 1912.

Application filed July 20, 1911. Serial No. 639,529.

*To all whom it may concern:*

Be it known that we, THOMAS H. KEPPEL and ROBERT F. KEPPEL, residing in the city of St. Louis and State of Missouri, and JESSE E. KEPPEL, Jr., residing in Indianapolis, in the county of Marion and State of Indiana, citizens of the United States, have invented new and useful Improvements in Aeroplanes, of which the following is a specification.

This invention relates to certain new and useful improvements in areoplanes.

The invention has for its general object to provide an air-craft of the heavier-than-air type which shall possess various features of novelty, both in construction and operation, combining to produce an aeroplane light and economical in construction, one that may be easily guided and controlled while in the air, and which will afford a high degree of safety in operation, or in the event the driving power should fail to work and it should become necessary to descend.

The invention may be stated to be briefly characterized by a cigar-shaped body forming the main support of the device, in which body is mounted the engine for driving the propeller, and which body is also provided with accommodations for seating one or more persons. Four wings or planes are employed in our device, two of these being located toward the front of the body and two toward the rear thereof, and being so mounted that they may be readily turned to change their position relative to the horizontal by mechanism within reach of the operator. At each end of the body a propeller is provided, these propellers being mounted on separate shafts and being separately driven, but provision being made for connecting their shafts so that they may be driven in unison.

A further characteristic feature of the invention resides in the provision of means for driving the yieldably-mounted wheels of a truck supporting the aeroplane as a whole, from the propeller shaft, when it is desired to move the machine over the ground.

Various details of construction and combinations and operations of parts are within the purview of our invention, but these will be more readily understood from the detailed description of the construction and operation of the machine to follow.

The invention is illustrated in the accompanying drawings, in which—

Figure 1 is a plan view of an aeroplane constructed according to our invention, the wings on one side being partly broken away; Fig. 2 is a view in side elevation of the same; Fig. 3 is a plan view of the truck for supporting the aeroplane and for propelling it over the ground; Fig. 4 is a view in front elevation of our aeroplane, certain parts being omitted for the sake of clearness of illustration; Fig. 5 is a vertical transverse section, on an enlarged scale, taken approximately on the line 5—5 of Fig. 2; Fig. 6 is a view partly in side elevation and partly in section, on the same scale as Fig. 5, showing the two motors employed in driving our aeroplane, the driven shafts and clutch mechanism associated therewith; Fig. 7 is a transverse section on the line 7—7 of Fig. 2, a portion of the frame-work being broken away; Fig. 8 is a detail vertical section on the line 8—8 of Fig. 7 showing the gear mechanism at the forward end of the plane-actuating rods; Fig. 9 is a similar view showing the manner of supporting the rear ends of the actuating rods; Fig. 10 is a detail view, partly in elevation and partly in section, of the mechanism employed for operating the rear planes; Fig. 11 is a vertical transverse section on the line 11—11 of Fig. 2, but on a larger scale; Fig. 12 is a view in front elevation, on an enlarged scale, of the rudder; and Fig. 13 is a horizontal section on the line 13—13 of Fig. 12.

Referring now to these drawings, the numeral 1 indicates the main supporting body of the aeroplane, the same being substantially cigar-shaped and composed of strips 2, of wood or metal, spaced a suitable distance apart, and connected to rings 3, located at suitable intervals throughout the length of the body and on the interior thereof. At opposite ends the strips 2 are connected to conical heads 4, 5. Extending through the head 5 at the rear of the body is a shaft 6, which terminates practically at the center of the body, and has secured on its outer end adjacent to the head 5 a propeller 7. Extending through the head 4, and also terminating at about the center of the body 1, is a shaft 8 which has secured on its outer end adjacent to the head 4 a propeller 9. Within the body 1 we mount a skeleton yoke-frame 10 which is formed of four bars of metal 11 positioned at right angles to each other, and converging at opposite ends where they are connected to sleeves 12 (Fig. 6) surrounding the shafts 6 and 8. The yoke-frame is braced from the body 1 in any suitable manner as by brace-rods 11ª (Fig. 5). The sleeves 12 extend through the respective heads 4 and 5, and have secured in their opposite ends bearings 13 for the shafts 6 and 8. A portion of one of said sleeves is shown in Fig. 6, and only one of the bearings 13 is shown, but it will be understood that the construction is duplicated both as to the outer end of the sleeve 12 where it passes through the head 4 and as to the provision of a similar sleeve for supporting the other end of the yoke-frame 10, and having in its ends bearings for the shaft 6. Secured on the inner end of the shaft 6, as by means of a set screw 14, is a thimble 15 affording an open end or socket for the reception of the shaft 8, and being provided with roller bearings 16 supporting the end of the shaft 8.

17 indicates a hollow conical member, forming one element of a friction clutch, and being rigidly secured on the shaft 8, as indicated at 18.

19 indicates the male member of said clutch, the same being made hollow to move over without engaging the thimble 15 and being keyed on the shaft 6, as indicated at 20, so as to be capable of longitudinal movement on said shaft, while rotating with it, in the usual manner of such devices.

21 indicates a hanger secured on the upper member 11 of the yoke-frame 10, and having pivotally mounted in its lower end at 22 a lever 23 which is bifurcated at its lower end, as indicated at 24, to embrace the hub 25 of the clutch member 19, said hub having an annular groove 26 in which engage pins 27 provided in the lower ends of the bifurcated portion 24 of the lever 23.

28 indicates a rod for actuating the lever 23, and by throwing said lever in one direction or the other the clutch member 19 may be brought into frictional engagement with the clutch member 17 so as to cause the shafts 6 and 8 to be locked together and to rotate in unison, or to separate said clutch members to permit the shafts to be driven independently of each other.

29 indicates the motor for driving the shaft 8. Loosely mounted on the shaft 8 is one member 30 of a friction clutch which has secured thereon a sprocket wheel 31. On the shaft of the motor 29 there is secured a sprocket wheel 32, and a sprocket chain 33 is passed over the two sprocket wheels, whereby such clutch member 30 may be driven from the motor 29. 34 indicates the movable member of this clutch, the same being keyed on the shaft 8 in a well-known manner, and being actuated by the lever 35 pivoted at 36 on a hanger 37 mounted on the yoke-frame 10, the lever 35 being actuated by a rod 38. When the lever 35 is moved by the rod 38 to throw the clutch member 34 into engagement with the clutch member 30 the shaft 8 will be rotated, and when the members of the clutch are separated the clutch member 30 will rotate as an idler, without actuating the shaft 8.

39 indicates the motor for driving the shaft 6. Loosely mounted on the shaft 6 is one member 40 of a clutch, the other member 41 of which is keyed to the shaft in a well-known manner and adapted to be actuated by a lever 42 pivotally mounted at 43 on a hanger 44 supported on the yoke-frame 10, the lever 42 being actuated by the rod 45. The idler member 40 of the clutch has secured thereon a sprocket wheel 46, the shaft of the motor 39 has mounted thereon a sprocket wheel 47, and a sprocket chain 48 is passed over these two sprocket wheels so that the shaft 6 may be driven from the motor 30 when the clutch members 40 and 41 are in engagement. When these clutch members are disengaged the member 40 of the clutch will rotate as an idler on the shaft in the same manner as the clutch member 30 previously described.

At the forward end of the body 1 we provide two closely adjacent brace rings 49. Extending transversely through the body is a shaft 50 which passes through bearings 51 provided on opposite sides of the body and which are secured in position by having flange members 52 thereof secured to the brace rings 49. The construction at one side of the body is shown in Fig. 7. The numerals 53 indicate, respectively, the two forward planes, each of which is rigidly secured to a transverse shaft 54 which projects beyond opposite sides of the planes and the inner ends of which are removably secured to the outer ends of the shaft 50. At the rear of the machine a shaft 55, corresponding to the shaft 50, passes transversely through the body 1 and is supported at opposite sides of the body in bearings 56 which are secured in position by means of having flange members 57 thereof bolted or riveted to brace rings 58, as shown more clearly in Fig. 5. The numerals 59 indicate, respectively, the rear planes of the machine, each of which is rigidly secured to a shaft 60 extending transversely through the plane and projecting from opposite sides thereof, the inner ends of said shafts being removably secured to the outer ends of the shaft 55. The manner of removably securing the shafts 60 and 54 to the inner ends of the respective shafts 50 and 55 is the same, and is more clearly shown at the right of Fig. 1. This construction consists in providing the end of each shaft 60 with a socket member 61 which receives the opposite ends of the shaft 55 and are rigidly secured to the ends of said shaft by means of set screws 62.

Secured to the head 4 and projecting laterally therefrom are bracket-arms 63 which have at their extremities a pair of inwardly-extending guide-pins 64. Mounted on opposite sides of the body 1 are bracket-arms 65 on which are mounted inwardly-extending guide-pins 66.

The numerals 67 indicate rings which are connected to the inner ends of the planes 53 at a slight distance therefrom by means of brackets 68 which are connected to the planes, and also to the said rings at substantially diametrically opposite points of the latter.

69 (Figs. 4 and 7) indicates a brace-rod which, in the horizontal position of the planes 53, extends vertically from top to bottom of each of the rings 67 and is secured at its ends to the rings. Secured on each brace rod 69 is a sleeve 70, and connected to the sleeve 70, and extending at right angles thereto, is a similar sleeve 71 through which the shaft 50 extends and to which it is firmly connected. Each of the rings 67 is positioned to work between the respective sets of guide-pins 64 and 66, which prevent lateral displacement of said rings, and by turning the shaft 50 in the manner hereinafter to be described the brace rods, 69, which are rigidly connected to said shaft, and the rings 67 which are connected to said brace rods, will be turned, thereby turning also the planes 53 which are rigidly connected to the rings 67. This construction thoroughly braces the planes 53 and prevents all lateral displacement while permitting them to be easily turned to the desired position. The rear planes are braced by means of brace rods 72 which connect the outer ends of the shafts 54 and 60 of each pair of front and rear planes. The brace rods 69 are connected at their extremities by means of cross bars 73, and preferably are provided with eyelets at their opposite ends, as indicated at 74. The planes 53 are further supported and braced against horizontal displacement by means of sets of stay-wires 75 extending preferably from the outer end, the central portion and the inner end of each plane, and from the top and under side thereof, all of the wires on the upper side of the plane being connected to a ring engaging in a hook of a turn-buckle 76, and the wires on the under side of each plane being connected in like manner to a similar hook of a turn-buckle 77, the turn-buckles being in turn secured by a swivel in the eyelets of the brace rods 69, as clearly shown in Fig. 4.

At the rear of the machine we provide on opposite sides of the body vertically-disposed brace rods 78 (Fig. 2) which are connected at their extremities by cross rods 79 (Fig. 1), only one of such cross rods (the upper one) being shown. The construction, however, as respects these brace rods is exactly the same as at the front of the machine, omitting the rings 67, and the rear planes 59 are supported and braced by wires 80 connected in like manner to the extremities of the vertical brace rods 78, as above described with reference to the connection of the stay-wires of the planes 53 to the extremities of the vertical rods 69. In like manner the vertical rods 78 have mounted thereon sleeves such as 70 and 71 so that when the shaft 55 is turned the planes 59 may be correspondingly turned. As this construction is fully illustrated in Fig. 7 with reference to the shaft 50, and as the exact construction is duplicated in the rear of the machine with respect to the shaft 55, it is thought unnecessary to duplicate the illustration of such parts. Also the manner of bracing the rear planes 59 with stay-wires is exactly the same as illustrated in Fig. 4 with reference to the forward planes 53, and a more detailed description thereof is not considered necessary. It remains to be stated that with either pair of planes by screwing up the turn-buckles the wires may be tightened, and by unscrewing these turn-buckles and disengaging its hook from the rings to which the wires are connected, then removing the brace rods 72 and loosening the set screws 62, (Fig. 1) the planes may be removed from the body.

While not wishing to be limited to the precise construction of the body as shown we have found a convenient construction to be that illustrated, which comprises in each instance strips of metal or wood, 81, connected at their ends to form a rectangular frame, transverse stay-strips 82 extending from end to end of the planes and central stay-strip 83 extending from front to rear thereof. The plane as a whole, is covered preferably with substantially transparent sheet celluloid 84. Also the body 1 in its entirety is covered with sheet celluloid 84$^a$ except for a certain portion at the center and in the bottom thereof to permit entrance of the operator, and also to provide ventilation. By covering the body 1 to form an inclosed body the operator is almost entirely protected from the blast of air when sailing, and by using a transparent covering for the planes and the rudder, the latter of which will be later referred to, the machine, as a whole, will be almost invisible at any considerable elevation or distance from the observer, and this we regard as a very important feature in the use of the aeroplane for reconnoitering purposes, or similar work, in military operations.

We will now describe in order the mechanism for actuating the front and rear planes to change their angles of inclination, referring particularly to Figs. 7, 8, 9 and 10. Mounted on cross beams 85, and extending between the brace rings 49, is a bracket 86 forming a housing for a worm gear 87 which is fixedly secured on the shaft 50, and also affording at opposite sides bearings 88 for said shaft. The base of the bracket 86 in connection with the frame members 85 also affords on opposite sides bearings for a short shaft 89 which is provided with a worm 90 in mesh with the worm gear 87. 91 indicates an actuating rod which is connected to the short shaft 89 by means of a universal joint as indicated at 92. 93 indicates vertical, and 94 transverse brace bars, which extend from top to bottom and from side to side of the main body 1, and which are united at the center to a collar 95 through which the sleeve 12 and shaft 8 extend. Mounted on the brace bar 94 at one side of the vertical brace bar 93 is a bracket arm 96 which is provided with a bearing 97 at its lower end for the reception of the rod 91 which projects through the bearing and is provided on its inner end with a hand wheel 98. By turning the hand wheel 98 the actuating rod will cause the shaft 89 to be turned and through the medium of the worm 90 and worm gear 87 the shaft 50 will be correspondingly rotated, and this shaft in turn will move the frame bars 69 and rings 67 to which the planes 53 are rigidly connected, and thus said planes may be readily moved to any desired inclination. The bracket 86, by means of having a bearing on the shaft 50 and being rigidly secured to the cross beams 85 will hold the worm gear 87 in fixed relation to the worm 90, and prevent relative displacement of these members irrespective of the movement of the machine as a whole, or of any strain to which the shaft 50 may be subjected, short of a breaking strain. On the opposite side of the vertical brace rods 93 to that just described we mount on the cross beams 85 a bracket 99 which forms on opposite sides a bearing for a shaft 100 on which is fixedly secured a gear wheel 101. 102 indicates the actuating rod for the rear planes, said rod being connected to the short shaft 100 by means of a universal joint as indicated at 103, and having at its lower end a hand wheel 104. At its lower end the actuating shaft 102 is supported in a bearing 105 provided in the lower end of a bracket arm 106, which in turn is mounted on the transverse brace bar 94. 107 indicates a shaft which at its forward end has a bearing in the sides of the bracket 99, and also in the cross beams 85, and has secured on said forward end a spur gear 108. Toward the rear of the machine, and extending between the brace rings 58, we provide transverse cross beams 109 to which are secured the legs of a bracket 110 corresponding to the bracket 86, the sides of which bracket and said cross beams form a bearing for the rear end of the shaft 107. Intermediate the cross beams 109 there is secured on the shaft 107 a worm 111 which is in mesh with a worm gear 112 mounted on the shaft 55, which latter shaft extends through bearings 113 provided on opposite sides of the bracket 110. By rotating the hand wheel 104 the gear wheel 101 will be actuated, the spur gear 108 will thereby rotate the shaft 107, which, in turn, through the worm 111 and worm gear 112, will rotate the shaft 55 which, through the medium of the frame composed of the bars 78 and 79 to which the shafts 60 of the rear planes 59 are rigidly connected, will cause said planes to be turned to the desired inclination.

Depending from the top of the body 1 are suitable hangers 114 which support a horizontally-disposed bearing rod 115 (Fig. 5) on which are pivotally mounted the upper ends of a series of hand levers for actuating the respective rods 38, 28 and 45 (Fig. 6), and another rod later to be referred to. Of these the hand lever 116 is pivotally connected, as indicated at 117, to the rod 38, the lever 118 is in like manner pivotally connected to the rod 28, and the lever 119 to the rod 45. These hand levers, as well as the hand wheels 98 and 104, are within easy reach of the operator who occupies a seat adjacent thereto, as indicated at 120, (Figs. 2 and 5).

The truck for supporting the aeroplane on the ground and by means of which it may be propelled over the ground, comprises forward supports 121 and rear supports 122, and a central brace frame 123. The front axle 124 is provided centrally with an upright pin which works through a head 125 and is surrounded by a coil spring 126. The forward supports 121 have their lower ends secured on a cross piece 127 which is secured on the head 125. In this way the weight of the aeroplane at the front is yieldably borne on the spring 126. The front wheels are pivotally mounted at the ends of the axle in the manner of an automobile, as indicated at 128, and their hubs are connected by a bar 129, which, in turn, is connected to a steering rod 130 (Fig. 2) by means of which the wheels may be turned to guide the machine over the ground. The rear axle 131 is mounted in the ends of rock-arms 132 which are pivotally supported intermediate their ends on a cross shaft 133 mounted in bearings in the lower ends of the rear supports 122. Each of the rock-arms 132 has a forward upwardly-projecting portion 134, and to this projecting portion is connected one end of a relatively long coiled spring 135, the other end of which is connected to a bracket 136 secured on the frame 1, as more clearly shown in Fig. 11. In landing, the rear wheels are invariably made to strike the ground first, and in the construction described the axle 131 with its wheels can rise thereby moving the forward ends of the rock-arms 132 downward against the resistance of the springs 135, the turned-up portion 134 preventing said rock-arms from digging into the ground should the impact or pressure be sufficient to force said forward ends to the earth. This provision of a yieldingly-mounted rear axle will, of course, tend to prevent jars and shocks when landing, and will thereby greatly prolong the life of the machine.

In order to propel the machine over the ground we provide the following mechanism: Secured on the rear axle 131 is a sprocket wheel 137. Rotatably mounted on the cross shaft 133 is a sleeve 138 confined between collars 139 and having secured thereon a sprocket wheel 140 and a miter-gear 141. A sprocket chain 142 is passed over the sprocket wheels 137 and 140. The rear supports 122 are connected by a cross brace 143 on which is mounted a bearing 144 for an upright shaft 145, the lower end of which has mounted thereon a miter-gear 146 in mesh with the miter-gear 141. Toward the rear of the yoke-frame 10 a cross bar 147 extends from side to side of the body 1, and mounted centrally of this cross bar is a bearing 148 for the upper portion of the shaft 145, said shaft being provided at its upper end with a beveled gear 149, and being likewise supported in a bearing 150 at the bottom of the body 1. 151 (Fig. 6) indicates one member of a friction clutch, said member being loosely mounted on the shaft 6 and being provided with a beveled gear 152 in mesh with the beveled gear 149. The other member of the clutch is indicated by 153, and is keyed on the shaft 6 in the usual manner, being adapted to be moved into and out of frictional engagement with the member 151 by the lever 154 pivotally mounted at 155, on a bracket 156 depending from the upper member 11 of the yoke-frame 10, said lever 154 being adapted to be actuated by a rod 157, the inner end of which rod is pivotally connected at 158, (Fig. 5) to the fourth hand lever 159, as shown. The clutch members 40 and 41 being in engagement so that the shaft 6 is being revolved, it will be seen that by actuating the rod 157 to throw the clutch members 151 and 153 into frictional engagement the shaft 145 will be rotated, and through the miter-gearing and sprocket-gearing described will rotate the rear axle 131 and propel it over the ground.

Referring to Figs. 2, 5, 12 and 13, 160 indicates the rudder which comprises two blades 161, located one above and the other below the body 1, and in vertical alinement, and mounted in opposite ends of a forked post 162. The blades 161 are formed of suitable frames covered with transparent sheet celluloid. The post 162 is provided with a laterally-extending arm 163, to the outer end of which is pivotally secured one end of an actuating rod 164, the other end of which is pivotally connected to the lower end of a foot lever 165 (Fig. 5), which is pivotally mounted at 166 on a support 167 mounted on a cross bar 168, which latter likewise serves as one of the supports for the motor 29. The post 162 is centrally provided with a circular enlargement 169 surrounding the shaft 6 at a distance therefrom so as to permit the turning movement of the rudder, as will be understood, and as clearly indicated in Fig. 13. This turning movement is effected by the operator sitting on the seat 120, pushing the lever 165 outward or drawing it inward, as the case may be. The rudder post 162 is, of course, mounted in suitable bearings (not shown) at the upper and lower sides of the body 1.

In the operation of the device the shafts 6 and 8 may be driven separately, or by throwing the clutch member 19 into operation the shafts 6 and 8 may thereby be coupled together and driven from motor 29 or 39. On first leaving the ground the forward planes will have their front ends slightly elevated, but after reaching the desired altitude these planes may be brought to very nearly a horizontal position and any variation in altitude may be more conveniently and expeditiously effected by manipulating the rear planes.

In Fig. 2 we have shown by dotted lines two positions of the front and rear planes. In one position the inner ends of the two sets of planes are shown elevated, and this is one of the positions which may be given the planes in the event of an involuntary descent of the aeroplane. In such position the planes will act in the manner of a parachute and prevent a rapid descent of the machine, the air rushing out between the upper ends of the planes at the center, and allowing a gradual descent to be effected. In the other position, the outer ends of both sets of planes are shown elevated and in such position the two sets of planes present an inclined surface to the air in the downward fall of the machine, the air passing off at the ends of the planes. Either of such positions described will permit a slow descent of the aeroplane to be effected, and it is thus possible with our device to prevent a dangerously rapid descent should the motor stop working.

The manner of manipulating the planes, of guiding the machine, and of propelling it over the ground has been made sufficiently clear, it is thought, in the course of the above description. It remains to state in a general way that an aeroplane constructed according to our invention presents a well balanced machine, one that is thoroughly braced, so that, in effect, it presents a rigid structure, while at the same time the weight is extremely small in proportion to the strength of the structure. We have not thought it necessary to indicate in each case the material that is employed in the construction of the various parts described, for we wish it understood that where, for the purpose of strength, metal is desired we employ metal, and where wood will afford sufficient strength we employ wood in the interest of lightness of construction.

We claim:

1. An aeroplane embodying an elongated body, a propeller and motor mechanism for driving the same mounted thereon, a pair of rock-shafts located, respectively, toward the front and rear of said body, plane-supporting frames secured to said rock-shafts, pairs of planes located, respectively, at the front and rear of the body, the planes of each pair being on opposite sides of the body, respectively, each of said planes being detachably connected to the ends of the respective rock-shafts and having brace-wires extending from the tops and bottoms thereof, and detachably connected to opposite sides of said plane-supporting frames, and means for turning said rock-shafts to adjust the inclination of the planes.

2. An aeroplane embodying an elongated body, a propeller and motor mechanism for driving the same mounted thereon, rock-shafts mounted, respectively, at opposite ends of the body, means for turning said shafts, a plane-supporting frame mounted on each end of the rock-shaft at the front of the machine and comprising a ring, guide-pins mounted on the body and embracing said rings at opposite sides thereof, a plane rigidly connected to each of said rings and having a transverse shaft connected to and forming a continuation of said rock-shaft, a pair of planes located, respectively, on opposite sides of the body at the rear thereof, each of said rear planes having a transverse shaft connected to and forming a continuation of said rear rock-shaft, and brace rods connecting the outer ends of said transverse shafts.

3. An aeroplane embodying an elongated body, a propeller and motor mechanism for driving the same mounted thereon, planes pivotally mounted on the body at opposite sides thereof, means for turning said planes, and means for bracing the planes comprising a ring rigidly connected thereto, and guide-pins mounted on the body and embracing opposite sides of said ring.

4. An aeroplane embodying a body having adjustable planes mounted thereon, a pair of alining shafts mounted on said body, one of said shafts carrying a propeller at the front of the body and the other a propeller at the rear of the body, clutch mechanism for connecting or disconnecting said shafts at will, a friction clutch mounted on each of said shafts, one member of each clutch being loose on the shaft, and the other member being keyed thereon, a pair of motors, driving connections between each motor and the loose member of the respective clutches, whereby the shafts when connected may be rotated as a whole from either of said motors by operating the appropriate clutch mechanism, and lever mechanism for operating independently the various clutches.

5. An aeroplane embodying a body having adjustable planes mounted thereon, a pair of alining and abutting shafts, one of which carries a propeller at the front of the machine, and the other a propeller at the rear of the machine, a socket member carried by one shaft and having roller bearings embracing the end of the opposite shaft, a friction clutch, one member of which is fixedly secured near the abutting end of one shaft, and the other member of which is keyed on the other shaft, means for operating the movable member of the clutch to connect or disconnect said shafts at will, and motor driven mechanism controllably connected with each of said shafts.

6. In an aeroplane, in combination with an elongated frame, having propellers and means for driving the same mounted thereon, rock-shafts located, respectively, toward the front and rear of said frame, a plane fixedly secured on the end of each of said rock-shafts, means for rocking the forward shaft comprising a worm gear mounted thereon and a shaft mounted in said frame and having at one end a hand wheel and at the other end a worm in mesh with said gear, and means for rocking the rear rock-shaft comprising an actuating rod mounted in the frame and having a hand wheel at one end and provided at its other end with a gear wheel, a longitudinally-extending shaft mounted in said frame and having at one end a spur gear in mesh with said gear wheel and on its other end a worm, and a worm gear mounted on the rear rock-shaft and in mesh with said worm.

7. An aeroplane embodying a hollow inclosed elongated body, propellers mounted, respectively, on the front and rear end of said body, motor mechanism for driving said propellers, pairs of planes mounted, respectively, toward the front and rear of said body, the planes of each pair being located, respectively, on opposite sides of the body, means for varying the inclination of said planes, a two-part rudder mounted on the rear end of said body, one member of said rudder being located above and the other member below said body, and means for actuating said rudder, the rear propeller being located beyond the rear end of the rudder.

In testimony whereof, we have hereunto set our hands in presence of two subscribing witnesses.

THOMAS H. KEPPEL.
ROBERT F. KEPPEL.
JESSE E. KEPPEL, Jr.

Witnesses to the signatures of Thomas H. and Robert F. Keppel:
BRUCE S. ELLIOTT,
STELLA HILL.

Witnesses to the signature of Jesse E. Keppel, Jr.:
DAVID M. CARSON,
MARY E. GATES.

Copies of this patent may be obtained for five cents each, by addressing the "Commissioner of Patents, Washington, D. C."